(12) United States Patent
Gorissen et al.

(10) Patent No.: US 8,023,651 B2
(45) Date of Patent: Sep. 20, 2011

(54) BLOCK CIPHERING SYSTEM, USING PERMUTATIONS TO HIDE THE CORE CIPHERING FUNCTION OF EACH ENCRYPTION ROUND

(75) Inventors: Paulus Mathias Hubertus Mechtildus Antonius Gorissen, Eindhoven (NL); Joachim Artur Trescher, Eindhoven (NL); Antonius Adriaan Maria Staring, Eindhoven (NL); Willem Charles Mallon, Eindhoven (NL); Menno Anne Treffers, Eindhoven (NL)

(73) Assignee: Irdeto B.V. (NL)

( * ) Notice: Subject to any disclaimer, the term of this patent is extended or adjusted under 35 U.S.C. 154(b) by 1041 days.

(21) Appl. No.: 10/596,336

(22) PCT Filed: Nov. 30, 2004

(86) PCT No.: PCT/IB2004/052607
§ 371 (c)(1),
(2), (4) Date: Jun. 9, 2006

(87) PCT Pub. No.: WO2005/060147
PCT Pub. Date: Jun. 30, 2005

(65) Prior Publication Data
US 2008/0285744 A1 Nov. 20, 2008

(30) Foreign Application Priority Data
Dec. 11, 2003 (EP) .................................... 03104643

(51) Int. Cl.
*H04N 1/44* (2006.01)
(52) U.S. Cl. ............................ 380/200; 380/210; 726/26
(58) Field of Classification Search .................... 380/255
See application file for complete search history.

(56) References Cited

U.S. PATENT DOCUMENTS
4,751,733 A * 6/1988 Delayaye et al. ............... 380/42
(Continued)

FOREIGN PATENT DOCUMENTS
JP 08-016385 1/1996
(Continued)

OTHER PUBLICATIONS

Gabriele Spenger, "Authentication, Identification Techniques, and Secure Containers—Baseline Technologies," Digital Rights Management, LNCS 2770, pp. 62-80, 2003.*

(Continued)

*Primary Examiner* — Peter Poltorak
(74) *Attorney, Agent, or Firm* — Schwegman, Lundberg & Woessner, P.A.

(57) ABSTRACT

In a system, a server provides a digital signal processing function $f$ to an executing device in an obfuscated form. The function $f$ includes a function cascade of signal processing functions $f_i$, $1 \leq i \leq N$ (e.g., $FC_1(x) = f_N \circ \ldots \circ f_1(x)$). The server includes a processor for selecting a set of $2N$ invertible permutations $p_i$, $1 \leq i \leq 2N$; calculating a set of N functions $g_i$, where $g_i$ is functionally equivalent to $p_{2i}^{-1} \circ f_i \circ p_{2i-1}$, for $1 \leq i \leq N$; and calculating a set of $N-1$ functions $h_i$, where $h_i$ is functionally equivalent to $p_{2i-1}^{-1} \circ p_{2i-2}$, for $2 \leq i \leq N$. The server equips the executing device with an execution device function cascade that includes $y_N \circ h_N \circ y_{N-1} \circ h_{N-1} \circ \ldots \circ y_1$, where $y_1, \ldots, y_N$ are function parameters (e.g., $ED_1(y_1, \ldots, y_N) = y_N \circ h_N \circ y_{N-1} \circ h_{N-1} \circ \ldots \circ y_1$), and provides the functions $g_1, \ldots, g_N$ to the executing device. The executing device obtains the functions $g_1, \ldots, g_N$ and a processor for loading the execution device function cascade and applying the loaded execution device function cascade to the functions $g_1, \ldots, g_N$ (e.g., $ED_1(g_1, \ldots, g_N)$).

21 Claims, 8 Drawing Sheets

U.S. PATENT DOCUMENTS

| | | |
|---|---|---|
| 5,699,512 A | 12/1997 | Moriyasu et al. |
| 5,838,796 A * | 11/1998 | Mittenthal ............ 380/28 |
| 5,949,884 A * | 9/1999 | Adams et al. ............ 380/29 |
| 6,668,325 B1 | 12/2003 | Collberg et al. |

FOREIGN PATENT DOCUMENTS

| | | |
|---|---|---|
| JP | 2001-067270 | 3/2001 |
| JP | 2002-514333 | 5/2002 |
| WO | WO-99/01815 | 1/1999 |
| WO | WO-02/46890 | 6/2002 |
| WO | WO-2005/060147 A1 | 6/2005 |

OTHER PUBLICATIONS

Chow et al., "A White-Box DES Implementation for DRM Applications", Pre-proceedigns for ACM DRM-2002 workshop, Oct. 2002.*

"Japanese Application Serial No. 2006-543679, Office Action mailed Nov. 16, 2010", 7pgs.

Matsuoka, Masashi, et al., "A Case Study for Evaluating Tamper Resistance of Key-built-in Cryptographic Software by Engineers", Technical REport of IEICE, vol. 101, No. 311, (Sep. 10, 2010), 45-52.

* cited by examiner

$p_4(x) = \sqrt{x} \; ; p_4^{-1}(x) = x^2$ $\quad g_2(x) = p_4^{-1} \circ f_2 \circ p_3(x) = (\frac{x}{3} + 3)^2$ $p_3(x) = \frac{x}{3} \; ; p_3^{-1}(x) = 3x$ $\quad h_2(x) = p_3^{-1} \circ p_2(x) = 3 \bullet p_2(x)$ $f_2(x) = x + 3$ $\quad h_3(x) = p_5^{-1} \circ p_4(x) = p_5^{-1}(\sqrt{x})$

BLOCK CIPHERING SYSTEM, USING PERMUTATIONS TO HIDE THE CORE CIPHERING FUNCTION OF EACH ENCRYPTION ROUND

FIELD OF THE INVENTION

The invention relates to a method of providing a cascaded signal processing function to an execution device in a secure and/or personalized way. The invention also relates to a system for providing a cascaded signal processing function to an execution device in a secure and/or personalized way. The invention further relates to an execution device for executing a cascaded signal processing function provided in a secure and/or personalized way.

BACKGROUND OF THE INVENTION

Figure 1:
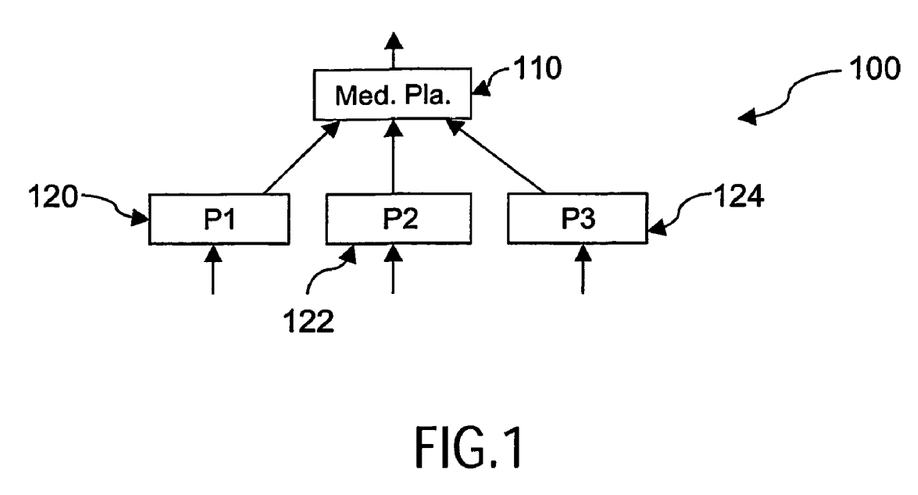
FIG. 1 shows a block diagram of a prior art plug-in based decoding.
Figure 2:
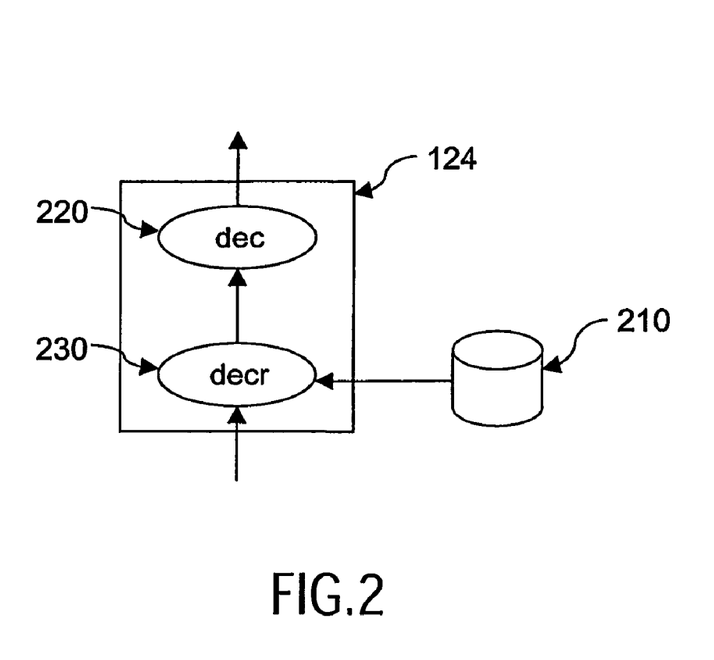
FIG. 2 shows a block diagram of a prior art based decryption.

The Internet provides users with convenient and ubiquitous access to digital content. Because of the potential of the Internet as a powerful distribution channel, many CE products strive to interoperate with the PC platform—the predominant portal to the Internet. The use of the Internet as a distribution medium for copyrighted content creates the compelling challenge to secure the interests of the content provider. In particular it is required to warrant the copyrights and business models of the content providers. Control of the playback software is one way to enforce the interests of the content owner including the terms and conditions under which the content may be used. In particular for the PC platform, the user must be assumed to have complete control to the hardware and software that provides access to the content and unlimited amount of time and resources to attack and bypass any content protection mechanisms. As a consequence, content providers must deliver content to legitimate users across a hostile network to a community where not all users can be trusted. The general approach in digital rights management for protected content distributed to PCs is to encrypt the digital content (for instance using DES) and to store the decryption key (or the "license") in a so-called License database on the PC's hard disk. Digital content on the PC is typically rendered using media players, such as Microsoft's Media Player, Real's RealOne Player, Apple's QuickTime player. Such players can load for a specific content format a respective plug-in for performing the format-specific decoding. Those content formats may include AVI, DV, Motion JPEG, MPEG-1, MPEG-2, MPEG-4, WMV, Audio CD, MP3, WMA, WAV, AIFF/AIFC, AU, etc. The player and plug-in structure is illustrated in FIG. 1, where a media player 100 includes a core player 110 and several format-specific plug-ins (shown are plug-ins 120, 122 and 124). The core player 110 may, for example, provide the user interface for controlling the player. Each plug-in includes a respective decoder. It may send the decoded content directly to rendering HW/SW, such as a sound-card, or pass it on to the core player 110 for further processing. For secure rendering, a secure plug-in is used that not only decodes the content in the specific format but also decrypts the content. This is illustrated in FIG. 2, where the encrypted content is first fed through a decryptor 230 and next the decrypted content is fed through the format-specific decoder 220. The decryptor 230 may receive a decryption key/license from a license database 210.

The largest vulnerability of digital rights management relying on encryption is the key distribution and handling. For playback, a software player has to retrieve a decryption key from the license database, it then has to store this decryption key somewhere in memory for the decryption of the encrypted content. This leaves an attacker two options for an attack of the key handling in a software player: firstly, reverse engineering of the license database access function could result in a black box software (i.e., the attacker does not have to understand the internal workings of the software function) capable of retrieving asset keys from all license databases. Secondly, by observation of the accesses to memory used during content decryption it is possible to retrieve the asset key.

Typically digital rights management systems use an encryption technique based on block ciphers that process the data stream in blocks using a sequence of encryption/decryption steps, referred to as rounds. The output of $i-1^{th}$ round is the input of the $i^{th}$ round. Thus, for a system with N rounds the algorithm can be described as a function cascade $f_N \circ \ldots \circ f_1(x)$, where function $f_i$ represents the functionality of round i. Most block algorithms are Feistel networks. In such networks, the input data block x of even length n is divided in two halves of length $$\frac{n}{2},$$

usually referred to as L and R. So, the input x fed to the first round is given as $x = \langle L_0, R_0 \rangle$. The $i^{th}$ round (i>0) performs the function $f_i$, where $f_i$ is defined as $$f_i(\langle L_{i-1}, R_{i-1} \rangle) = \langle R_{i-1}, (L_{i-1} \oplus F(R_{i-1}, K_i)) \rangle,$$

$K_i$ is a subkey used in the $i^{th}$ round and F is an arbitrary round function.

SUMMARY OF THE INVENTION

It is an object of the invention to provide a better protection of cascaded signal processing functions such as Feistel networks.

To meet the object of the invention, a method of providing a digital signal processing function $f$ to an executing device in an obfuscated form, where the function $f$ includes a function cascade including a plurality of signal processing functions $f_i$, $1 \leq i \leq N$, for processing a digital signal input x to yield a digital signal output (for example, $FC_1(x) = f_N \circ \ldots \circ f_1(x)$), includes:

selecting a set of 2N invertible permutations $p_i$, $1 \leq i \leq 2N$;

calculating a set of N functions $g_i$, where $g_i$ is functionally equivalent to $p_{2i}^{-1} \circ f_i \circ p_{2i-1}$, for $1 \leq i \leq N$;

calculating a set of N−1 functions $h_i$, where $h_i$ is functionally equivalent to $p_{2i-1}^{-1} \circ p_{2i-2}$, for $2 \leq i \leq N$;

equipping the executing device with an execution device function cascade that includes $y_N \circ h_N \circ y_{N-1} \circ h_{N-1} \circ \ldots \circ y_1$, where $y_1, \ldots, y_N$ are function parameters (for example, $ED_1(y_1, \ldots, y_N) \equiv y_N \circ h_N \circ y_{N-1} \circ h_{N-1} \circ \ldots \circ y_1$), providing the functions $g_1, \ldots, g_N$ to the executing device; and in the executing device, applying the execution device function cascade to the functions $g_1, \ldots, g_N$ (for example, $ED_1(g_1, \ldots, g_N)$).

Figure 4:
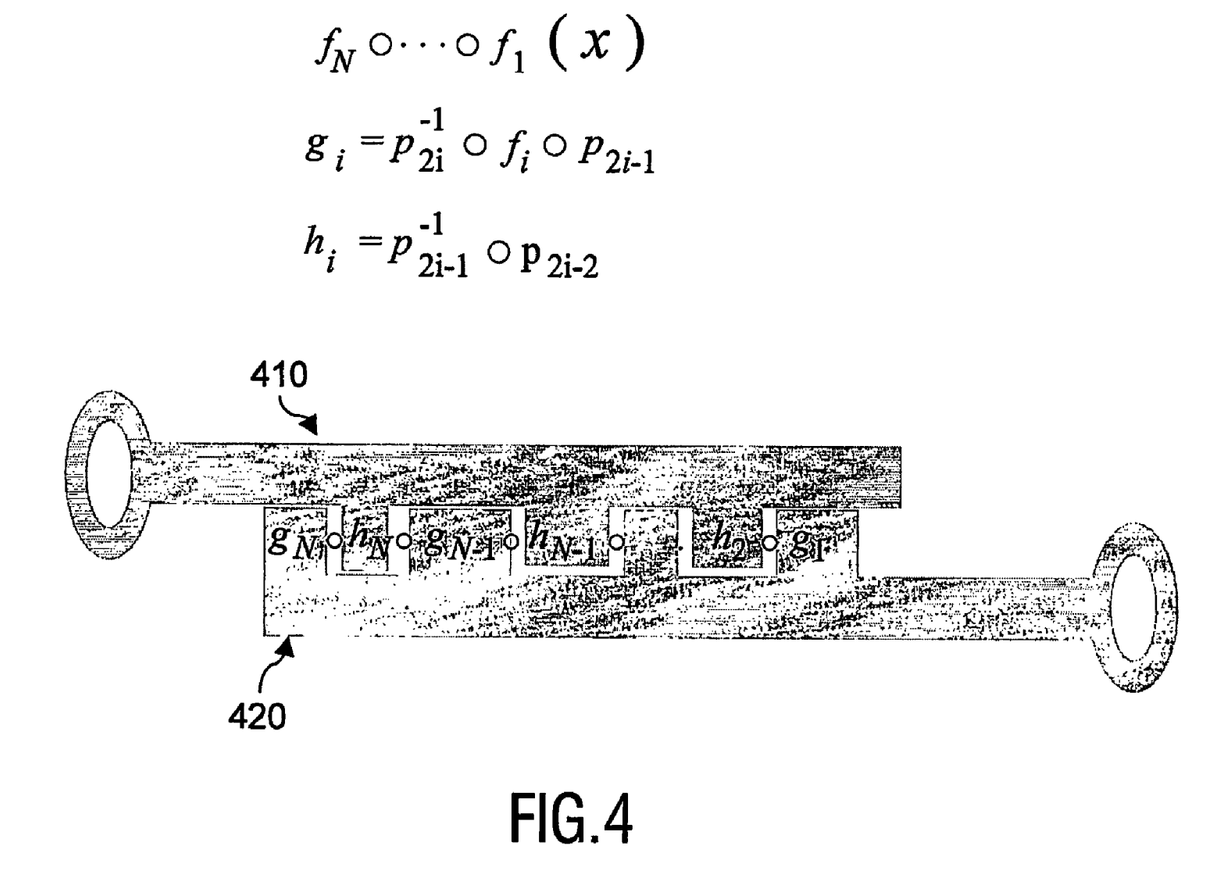
FIG. 4 shows the obfuscating according to the invention.

According to the invention the constituent functions $f_i$ are provided in an encapsulated form as $g_i$, where $g_i$ is functionally equivalent to $p_{2i}^{-1} \circ f_i \circ p_{2i-1}$, for $1 \leq i \leq N$. The functions $p_i$ used for the encapsulation are also hidden by being supplied in the form of $h_i$ which is a multiplied version of $p_{2i-1}^{-1} \circ p_{2i-2}$, for $2 \leq i \leq N$. By executing the functions $g_i$ and $h_i$ in the execution device in an interleaved manner (as for example is illustrated in FIG. 4) the functionality of the function cascade is achieved without $f_i$ being directly recognizable. In particular, if $f_i$ represents a round function of a Feistel cipher, the round key that is embedded in the round function is not directly recognizable. The obfuscated delivery of $f_i$ increases security. The execution function device cascade may form the core functionality of a media player, where the set $g_1, \ldots, g_N$ enables the player to execute a function cascade containing $f_1$ up to and including $f_N$.

The dependent claims 2 and 3 show two respective alternative embodiments for protecting the (functional) beginning of the function cascade. In the embodiment of claim 2, the execution device function cascade starts with $p_1^{-1}$, for example $ED_2(y_1, \ldots, y_N) = y_N \circ h_N \circ y_{N-1} \circ h_{N-1} \circ \ldots \circ y_1 \circ p_1^{-1}$. Applying this to $g_1, \ldots, g_N$, gives as a functional start of the function sequence executed in the device: $\ldots \circ g_2 \circ h_2 \circ g_1 \circ p_1^{-1} = \ldots \circ p_3^{-1} \circ f_2 \circ p_2 \circ p_2^{-1} \circ f_1 \circ p_1 \circ p_1^{-1} = \ldots \circ p_3^{-1} \circ f_2 \circ f_1$, in this way the execution device explicitly executes $f_1$. In the embodiment of claim 3, security is increased by extending the function cascade with a starting function $f_0$ that aids in hiding $p_1^{-1}$. The function cascade may, for example, be $FC_2(x) = f_N \circ \ldots \circ f_1 \circ f_0(x)$. The execution device function cascade starts with a function $S_1$, for example $ED_3(y_1, \ldots, y_N) = y_N \circ h_N \circ y_{N-1} \circ h_{N-1} \circ \ldots \circ y_1 \circ S_1$, where $S_1$ is functionally equivalent to $p_1^{-1} \circ f_0$. Since $S_1$ only represents $p_1^{-1}$ in a form multiplied with $f_0$, $p_1^{-1}$ can not be retrieved from the execution device in a direct way such as reading certain memory locations. Preferably, $f_0$ is a global secret.

The dependent claims 4 and 5 show two respective alternative embodiments for protecting the (functionally) ending of the function cascade in a manner analogous to claims 2 and 3

According to the measure of the dependent claim 6, the chosen sequence of permutations $p_i$ is unique for the device. In this way, the function cascade is supplied to the execution device not only in an obfuscated form but also in a personalized form. For example, if the function cascade represents a Feistel cipher with embedded decryption key, cryptanalytic or brute force attacks may result in obtaining the black box functionality of $g_1, \ldots, g_N$. This broken functionality would then only work in combination with the corresponding execution device function cascade and not with any other execution device. This significantly limits the impact of a successful attack.

According to the measure of the dependent claim 7, the execution device function cascade is embedded in a program, for example in the form of a media player or a plug-in for a media player. The execution device is thus provided with secure, personalized software.

According to the measure of the dependent claim 8, the functions $g_1, \ldots, g_N$, form a plug-in for the program. If the program itself is a plug-in, then the functions $g_1, \ldots, g_N$ are in effect a plug-in for the plug-in. As an alternative, according to the measure of the dependent claim 9, the functions $g_1, \ldots, g_N$ may be embedded in the same program as the execution device function cascade.

To meet an object of the invention, a computer program product operative to cause a processor in an execution device to execute a digital signal processing function $f$ including a function cascade including a plurality of signal processing functions $f_1$, where $1 \leq i \leq N$, for processing a digital signal input x to yield a digital signal output (for example, $FC_1(x) \equiv f_N \circ \ldots \circ f_1(x)$), by:

loading an execution device function cascade that includes $y_N \circ h_N \circ y_{N-1} \circ h_{N-1} \circ \ldots \circ y_1$, where $y_1, \ldots, y_N$ are function parameters, loading a set of functions $g_1, \ldots, g_N$;

applying the execution device function cascade to the set of functions $g_1, \ldots, g_N$; where:

$g_i$ is functionally equivalent to $p_{2i}^{-1} \circ f_i \circ p_{2i-1}$, for $1 \leq i \leq N$;

$h_i$ is functionally equivalent to $p_{2i-1}^{-1} \circ p_{2i-2}$ for $2 \leq i \leq N$; and $p_i$ is an invertible permutation, for $1 \leq i \leq 2N$.

To meet an object of the invention, a method of providing a digital signal processing function $f$ to a plurality of executing devices, each identified by a unique index j, in an obfuscated, anonymous form; the function $f$ including a function cascade including a plurality of signal processing functions $f_i$, where $1 \leq i \leq N$, for processing a digital signal input x to yield a digital signal output (for example, $FC_1(x) \equiv f_N \circ \ldots \circ f_1(x)$), includes:

selecting a set of 2N invertible permutations $p_i$, where $1 \leq i \leq 2N$;

calculating a set of N functions $g_i$, where $g_i$ is functionally equivalent to $p_{2i}^{-1} \circ f_i \circ p_{2i-1}$, for $1 \leq i \leq N$;

selecting for each device j a corresponding set and/or sequence of 2N invertible permutations $p_{j,i}$, that is unique for the device and/or a user of the device;

calculating for each executing device j a corresponding set of N−1 functions $h_{j,i}$, where $h_{j,i}$ is functionally equivalent to $p_{j,2i-1}^{-1} \circ p_{j,2i-2}$ for $2 \leq i \leq N$;

equipping each executing device j with a respective execution device function cascade $ED_j(y_1, \ldots, y_N)$ that includes $y_N \circ h_{j,N} \circ y_{N-1} \circ h_{j,N-1} \circ \ldots \circ y_1$;

equipping each executing device j with a respective loader function $loader_j(x_1, \ldots, x_N) = (l_{j,1} \circ x_1 \circ r_{j,1}, \ldots, l_{j,N} \circ x_N \circ r_{j,N})$, where $l_{j,i}$ is functionally equivalent to $p_{j,2i}^{-1} \circ p_{2i}$ and $r_{j,i}$ is functionally equivalent to $p_{2i-1}^{-1} \circ p_{j,2i-1}$;

providing to the executing device the functions $g_1, \ldots, g_N$; and in the executing device, executing $ED_j(loader_j(g_1, \ldots, g_N))$.

The functions $f_i$ are obfuscated in the form of the functions $g_1, \ldots, g_N$ in the same way as described for claim 1. The functions $g_1, \ldots, g_N$ are the same for each device and can be seen as corresponding to one default/anonymous device. The execution devices are equipped with a device specific ("personalized") execution device cascade. A device specific loader function is used to convert the respective anonymous functions $g_i$ to corresponding device specific functions that can be fed to the execution device cascade. The loader function uses conversion functions $l_{j,i}$ and $r_{j,i}$ that are based on a set/sequence of permutations $p_{j,i}$ that are not revealed.

According to the measure of the dependent claim 12, the functions $g_i$ can be supplied to all devices in a same way, for example, using broadcasting or on a storage medium, such as a CD-ROM or DVD.

These and other aspects of the invention are apparent from and will be elucidated with reference to the embodiments described hereinafter.

DETAILED DESCRIPTION OF THE PREFERRED EMBODIMENT

Figure 3:
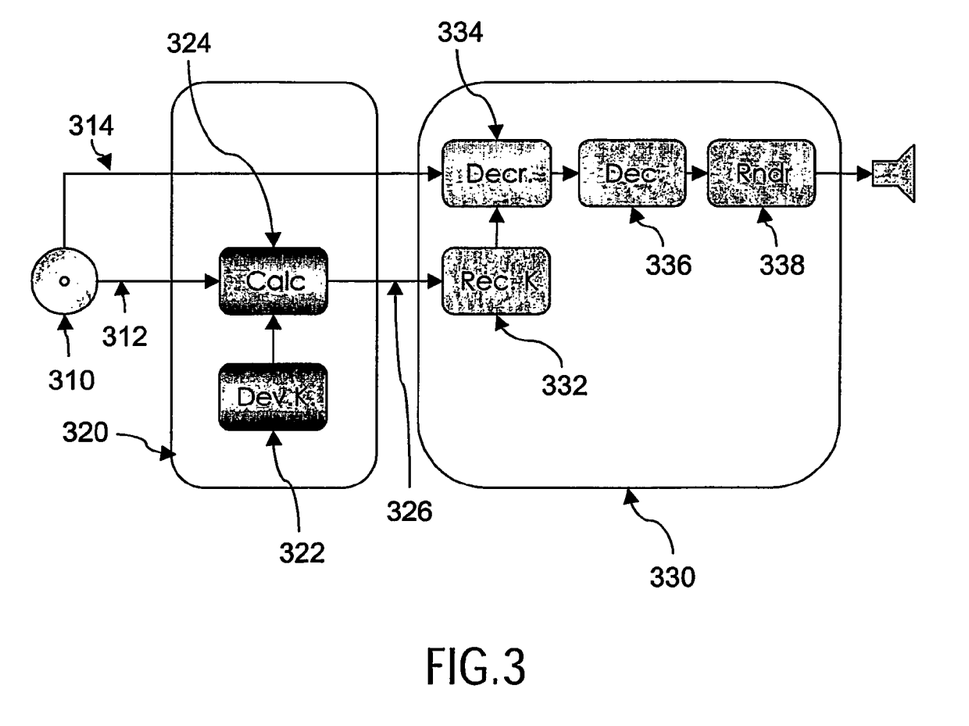
FIG. 3 shows a block diagram of a prior art integrated decryption/decoding system.

FIG. 3 shows a block diagram of prior art system in which the invention may be employed. In the example of FIG. 3 content (typically Audio and/or video content) is distributed on a medium 310. The medium may be the same for each player. The medium may be of any suitable type, e.g. audio CD, DVD, solid state, etc. The content on the medium is copy protected, preferably by being encrypted under using an encryption algorithm, such as a Feistel cipher. The storage medium may include information relating the decryption key. Alternatively, the storage medium may include information 312 (such as an identifier) that enables the player to retrieve the information, for example by downloading it from a server in the Internet. The decryption key is created in a secure module 320 by using a key-specific key 322 and the information 312 to calculate 324 the decryption key 326. The decryption key is the received 332 in a second module 330. The second module 330 decrypts 334, decodes 336 and renders 338 the content 314 of the medium 310.

FIG. 4 illustrates the method according to the invention. A digital signal processing function $f$ is provided to an executing device in an obfuscated form. The function $f$ includes a function cascade including a plurality of signal processing functions $f_i$, $1 \leq i \leq N$. For example the core of the function cascade may be formed by $FC_1(x) = f_N \circ \ldots \circ f_1(x)$. It should be noted that here the conventional mathematical notation is used: $g \circ f(x) = g(f(x))$. In principle, the function cascade may be any digital signal processing function. In a preferred embodiment, the function cascade includes a cipher. For example, the function $f_i$ may represent the $i^{th}$ round ($i>0$) of a Feistel cipher. In such a case, $f_i$, is defined as:

$$f_i(L_{i-1} \oplus R_{i-1}) = R_{i-1} \oplus (L_{i-1} \oplus F(R_{i-1}, K_i)),$$

where $K_i$ is a subkey used in the $i^{th}$ round and F is an arbitrary round function.

Figure 5:
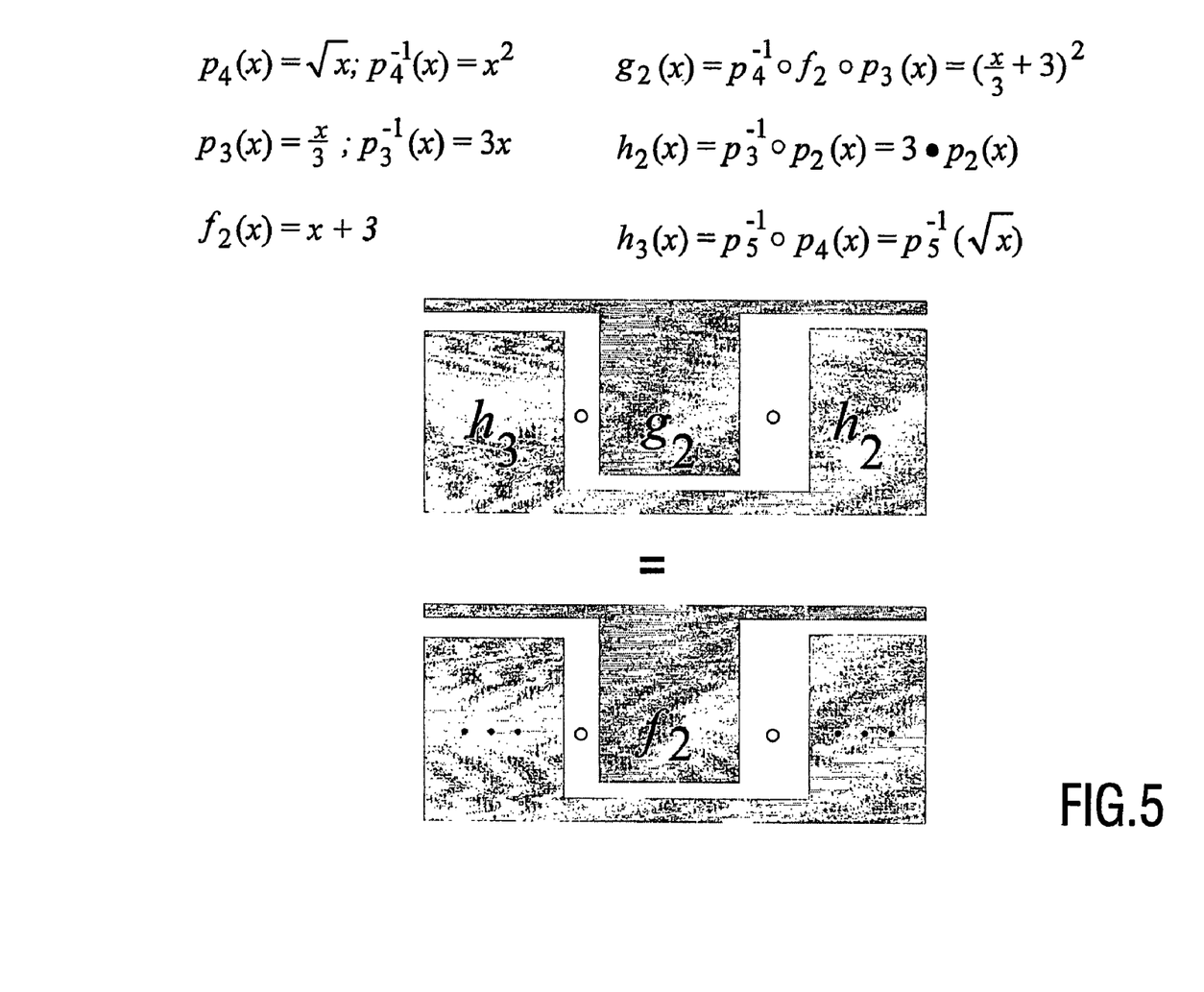
FIG. 5 shows a simple example of obfuscation.

According to the invention, a set of 2N invertible permutations $p_i$, $1 \leq i \leq 2N$ is selected. Next, a set of N functions $g_i$ is calculated, where $g_i$ is functionally equivalent to $p_{2i}^{-1} \circ f_i \circ p_{2i-1}$, for $1 \leq i \leq N$. In this context with functionally equivalent is meant that if $g_i$ is applied to a same input (e.g. x) the same outcome is achieved as when $p_{2i}^{-1} \circ f_i \circ p_{2i-1}$ is applied to that input, for each allowed value of the input. The composite functions $p_{2i}^{-1}$, $f_i$, and $p_{2i-1}$ are not separately visible. $g_i$ provides the black box functionality of $p_{2i}^{-1} \circ f_i \circ p_{2i-1}$. FIG. 5 illustrates this approach for very simple one-dimensional functions. In this example, $$p_4(x) = \sqrt{x} \; ; \; p_4^{-1}(x) = x^2; \; p_3(x) = \frac{x}{3}; \; p_3^{-1}(x) = 3x; \; f_2(x) = x+3.$$

Thus $$g_2(x) = p_4^{-1} \cdot f_2 \cdot p_3(x)$$

$$= p_4^{-1} \cdot f_2(p_3(x))$$

$$= p_4^{-1} \cdot f_2\left(\frac{x}{3}\right)$$

$$= p_4^{-1}\left(\frac{x}{3} + 3\right)$$

$$= \left(\frac{x}{3} + 3\right)^2.$$

It is well-known from the field of computer compiler building how the black box functionality of $p_{2i}^{-1} \circ f_i \circ p_{2i-1}$ can be achieved using so-called partial evaluation. Chapter 1 "Partial Evaluation and Automatic Program Generation" by N. D. Jones, C. K. Gomard, and P. Sestoft describes the concept of partial evaluation. This will not be described in more detail here. It will be appreciated that the digital signal input x is a multi-dimensional parameter, for example of 64 or 128 bit block/vector, to be able to perform a useful permutation. According to the invention, a set of N−1 functions $h_i$ is calculated, where $h_i$ is functionally equivalent to $p_{2i-1}^{-1} \circ p_{2i-2}$, for $2 \leq i \leq N$. Using the simple example of FIG. 5, $h_2(x) = p_3^{-1} \circ p_2(x) = 3 \cdot p_2(x)$; $h_3(x) = p_5^{-1} \circ p_4(x) = p_5^{-1}(\sqrt{x})$. Using these definitions, part of the execution device cascade that hides $f_2$ would be:

$$\ldots h_3 \cdot g_2 \cdot h_2 = \ldots \; (p_5^{-1}(\sqrt{x})) \cdot \left(\frac{x}{3} + 3\right)^2 \cdot (3 \cdot p_2(x))$$

$$= (p_5^{-1}(\sqrt{x})) \cdot \left(\frac{3 \cdot p_2(x)}{3} + 3\right)^2$$

$$= (p_5^{-1}(\sqrt{x})) \cdot (p_2(x) + 3)^2$$

$$= p_5^{-1}(\sqrt{(p_2(x) + 3)^2})$$

$$= p_5^{-1}(p_2(x) + 3).$$

It can be observed that this is indeed functionally equivalent to $p_5^{-1} \circ f_2 \circ p_2(x)$. Thus, the executing device that has executed this cascade has executed $f_2$ without having explicit knowledge of $f_2$.

In a further example, N=2, and $f_1$ and $f_2$ are each evaluated to a respective mapping table given by:

$f_1$: {0→3, 1→1, 2→6, 3→2, 4→7, 5→5, 6→4, 7→0, 8→8}, $f_2$: {0→4, 1→1, 2→5, 3→7, 4→6, 5→2, 6→0, 7→8, 8→3}.

In this example, $f_1$ is an invertible function that converts a number between 0 and 8 to a number between 0 and 8, e.g. value 0 is converted to value 3, value 1 to 1, value 2 to 6, etc. The following four respective permutations are used in this example:

$p_1$: {0→5, 1→3, 2→1, 3→7, 4→0, 5→6, 6→2, 7→8, 8→4}

$p_2$: {0→8, 1→6, 2→7, 3→3, 4→4, 5→2, 6→0, 7→1, 8→5}

$p_3$: {0→3, 1→5, 2→7, 3→1, 4→6, 5→0, 6→2, 7→8, 8→4}

$p_4$: {0→3, 1→0, 2-5, 3→2, 4→7, 5→8, 6→1, 7→4, 8→6}

For this example the following three inverse permutations are used:

$p_2^{-1}$: {0→6, 1→7, 2→5, 3→3, 4→4, 5→8, 6→1, 7→2, 8→0}

$p_3^{-1}$: {0→5, 1→3, 2→6, 3→0, 4→8, 5→1, 6→4, 7→2, 8→7}

$p_4^{-1}$: {0→1, 1→6, 2→3, 3→0, 4→7, 5→2, 6→8, 7→4, 8→5}

Giving these functions, $h_2(x) = p_3^{-1} \circ p_2(x)$ is then given as:

$h_2$: {0→7, 1→4, 2→2, 3→0, 4→8, 5→6, 6→5, 7→3, 8→1}.

For example, $p_2$ maps 0 to 8 and $p_3^{-1}$ maps 8 to 7. Thus, $h_2(0)=p_3^{-1} \circ p_2(0)=7$. Similarly, $g_1(x)=p_2^{-1} \circ f_1 \circ p_1(x)$ is given by:

$g_1$: {0→8, 1→5, 2→7, 3→6, 4→3, 5→4, 6→1, 7→0, 8→2} and $g_2(x)=p_4^{-1} \circ f_2 \circ p_3(x)$ is given by:

$g_2$: {0→4, 1→3, 2→5, 3-6, 4→1, 5→7, 6→2, 7→0, 8→8}

The executing device is equipped with the execution device function cascade that includes $y_N \circ h_N \circ y_{N-1} \circ h_{N-1} \circ \ldots \circ y_1$, a where $y_1, \ldots, y_N$ are function parameters. This is shown in FIG. 4 as a sequence of functions $h_N, h_{N-1}, \ldots, h_2$ 410. An exemplary execution device function cascade is $ED_1(y_1, \ldots, y_N) \equiv y_N \circ h_N \circ y_{N-1} \circ h_{N-1} \circ \ldots \circ y_1$. Furthermore, the functions $g_1, \ldots, g_N$ are provided to the executing device. This is shown in FIG. 4 as a sequence of functions $g_1, g_{N-1}, \ldots, g_1$ 420. In the executing device, the execution device function cascade is applied to the functions $g_1, \ldots, g_N$. This gives, for example, the total signal processing function $ED_1(g_1, \ldots, g_N)$ in the executing device. This function can then be applied to the digital signal input x.

Taking a look at a middle part of the chain like $h_{i+1} \circ g_i \circ h_i$, this gives: $h_{i+1} \circ g_i \circ h_i = p_{2i+1}^{-1} \circ p_{2i} \circ p_{2i}^{-1} \circ f_i \circ p_{2i-1} \circ p_{2i-1}^{-1} \circ p_{2i-1} = p_{2i+1}^{-1} \circ f_i \circ p_{2i-2}$. The first and least term of this expression will be eliminated by the respective g terms. The total outcome is that the executing device executes a function that includes the function cascade $f_N \circ \ldots \circ f_1(x)$ without having access to any of the functions $f_i$. These functions are thus obfuscated.

In preferred embodiments, options are given for dealing with the beginning and ending of the chain. Without any further measures, the resulting total signal processing function in the executing device may be $ED_1(g_1, \ldots, g_N) \equiv p_{2N-1}^{-1} \circ f_N \circ \ldots \circ f_1(x) \circ p_1$. For example, the term $p_1$ can be eliminated by using an execution device function cascade that includes $y_N \circ h_N \circ y_{N-1} \circ h_{N-1} \circ \ldots \circ y_1 \circ p_1^{-1}$. For example, $ED_2(y_1, \ldots, y_N) \equiv y_N \circ h_N \circ y_{N-1} \circ h_{N-1} \circ \ldots \circ y_1 \circ p_1^{-1}$. Preferably, the term $p_1^{-1}$ is kept secure in the executing device. A preferred way of doing this is to extend the function cascade with a further signal processing function $f_0$, (for example, $FC_2(x) \equiv f_N \circ \ldots \circ f_1 \circ f_0(x)$). The execution device function cascade then includes $y_N \circ h_N \circ y_{N-1} \circ h_{N-1} \circ \ldots \circ y_1 \circ S_1$, for example ($ED_3(y_1, \ldots, y_N) \equiv y_N \circ h_N \circ y_{N-1} \circ h_{N-1} \circ \ldots \circ y_1 \circ S_1$), where $S_1$ is functionally equivalent to $p_1^{-1} \circ f_0$. In this way the individual terms $p_1^{-1}$ and $f_0$ need not be revealed, but only the multiplicated form $p_1^{-1} \circ f_0$ exists. Preferably, $f_0$ is a global secret, i.e. known to the parties that need to known it but not distributed any further. Global secrets in itself are known and ways of communicating global secretes in a secure way are also known and will not be discussed here any further.

In a corresponding way, measures can be taken for dealing with the term $p_{2N-1}^{-1}$. For example, the execution device function cascade may include $p_{2N-1} \circ y_N \circ h_N \circ y_{N-1} \circ h_{N-1} \circ \ldots \circ y_1$ (e.g, $ED_4(y_1, \ldots, y_N) \equiv p_{2N-1} \circ y_N \circ h_N \circ y_{N-1} \circ h_{N-1} \circ \ldots \circ y_1$). To better protect $p_{2N}$, the function cascade may end with a further signal processing function $f_{N+1}$, (for example, $FC_3(x) \equiv f_{N+1} \circ f_N \circ \ldots \circ f_1(x)$). The execution device function cascade then includes $S_2 \circ y_N \circ h_N \circ y_{N-1} \circ h_{N-1} \circ \ldots \circ y_1$ (e.g., $ED_5(y_1, \ldots, y_N) \equiv S_2 \circ y_N \circ h_N \circ y_{N-1} \circ h_{N-1} \circ \ldots \circ y_1$), where $S_2$ is functionally equivalent to $f_{N+1} \circ p_{2N}$.

Figure 6:
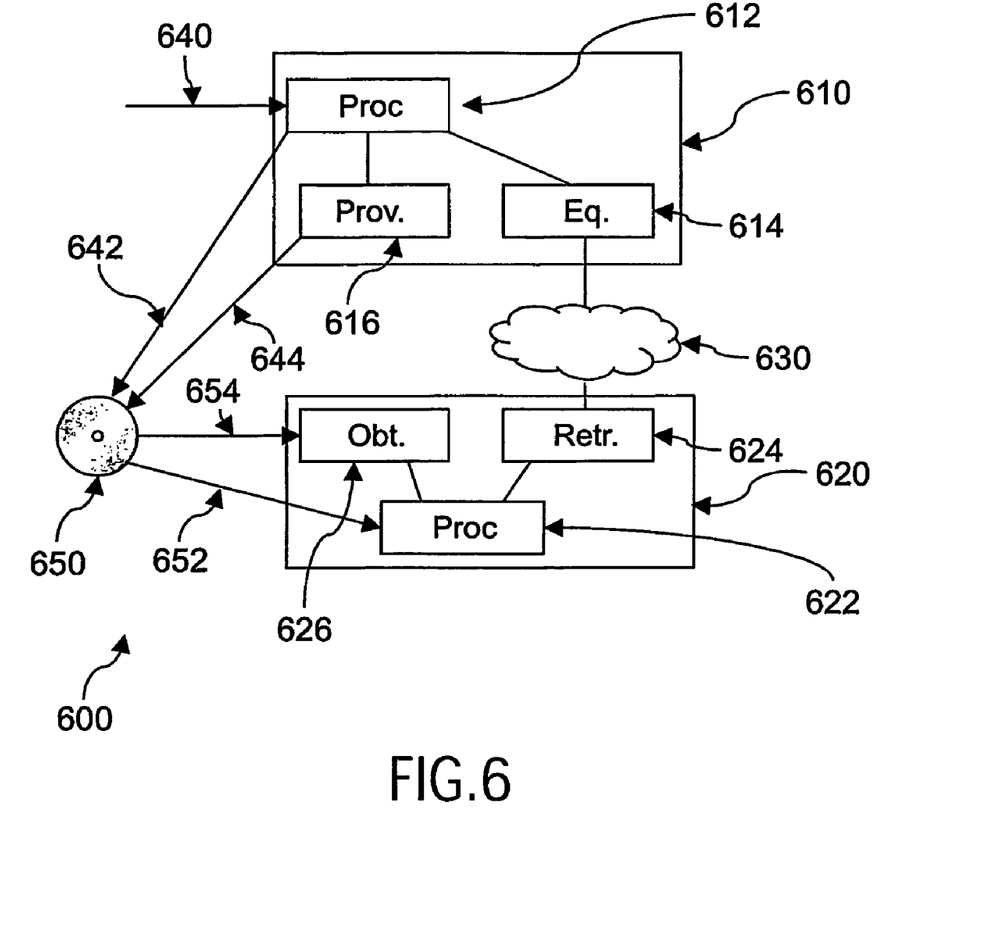
FIG. 6 shows a block diagram of a system according to the invention.

FIG. 6 illustrates a system in which the invention may be employed. The system 600 includes a server 610 and at least one executing device 620. The server may be implemented on a conventional computer platform, for example on a platform used as a server, such as a web server, or file server. The server includes a processor 612. The processor 612 is operated under control of a program. The program may be permanently embedded in the processor in an embedded storage, like embedded ROM, but may also be loaded from a background storage, such as a hard disk (not shown). Under control of the program, the processor 612:

selects the set of 2N invertible permutations $p_i$, $1 \leq i \leq 2N$;
calculates the set of N functions $g_i$, where $g_i$ is functionally equivalent to $p_{2i}^{-1} \circ f_i \circ p_{2i-1}$, for $1 \leq i \leq N$; and
calculates the set of N-1 functions $h_i$, where $h_i$ is functionally equivalent to $p_{2i-1}^{-1} \circ p_{2i-2}$, for $2 \leq i \leq N$.

The permutations may be selected (e.g. randomly or pseudo-randomly) chosen from a very large set of permutations that may be stored in a (preferably secure) storage (not shown). The server may also use a suitable program to generate the permutations. It is well-known how to create invertible permutations and this will not be described here any further.

Additionally, the server includes means 614 for equipping the executing device with an execution device function cascade that includes $y_N \circ h_N \circ y_{N-1} \circ h_{N-1} \circ \ldots \circ y_1$, where $y_1, \ldots, y_N$ are the function parameters. The server may do this in any suitable form. For example, in a factory the terms $h_i$ may be stored in a storage module of the executing device during the manufacturing of the executing device 620. FIG. 6 shows that the terms are downloaded through the Internet 630 directly to the executing device 620. The server 610 also includes means 616 for providing the functions $g_1, \ldots, g_N$ to the executing device 620. The functions $g_i$ incorporate the respective functions $f_i$. The functions $f_i$ may be chosen specifically for the digital signal input x. For example, each video title may be encrypted with a corresponding encryption function (e.g. using a same cipher but with a content specific key). To this end, the server 610 may also include the software for controlling the processor 612 to encrypt the content 640 and supply the encrypted content 642 to a distribution medium, e.g. for distribution on a storage medium or through a communication medium like the Internet.

The executing device 620 includes means 626 for obtaining the functions $g_1, \ldots, g_N$ from the server 610. These means cooperate with the means 616 of the server and will not be described further. The executing device 620 further includes a processor 622. The processor may be of any suitable type, such as a processor known from personal computers or an embedded microcontroller. The processor 622 is operated under control of a program. The program may be permanently embedded in the processor 622 using an embedded storage, like embedded ROM, but may also be loaded from a background storage, such as a hard disk (not shown). Under control of the program, the processor 622 loads the execution device function cascade and applies the loaded execution device function cascade to the functions $g_1, \ldots, g_N$, for example by executing $ED_1(g_1, \ldots, g_N)$. The resulting signal processing function may then be applied to the signal input x (e.g. content received from a medium). The processor 622 may load the execution device function cascade in any suitable form. For example, the cascade may have been pre-stored during manufacturing in a storage, reducing the loading to a straightforward memory read access. In the example of FIG. 6, the executing device 620 includes means 624 for retrieving the cascade (or the terms of the cascade), for example, through the Internet 630 or from the medium 650. Similarly, the executing device 620 may retrieve encrypted content 652 from the medium 650, and decrypt this using the processor 622. The processor may also decode the decrypted content.

Figure 7:
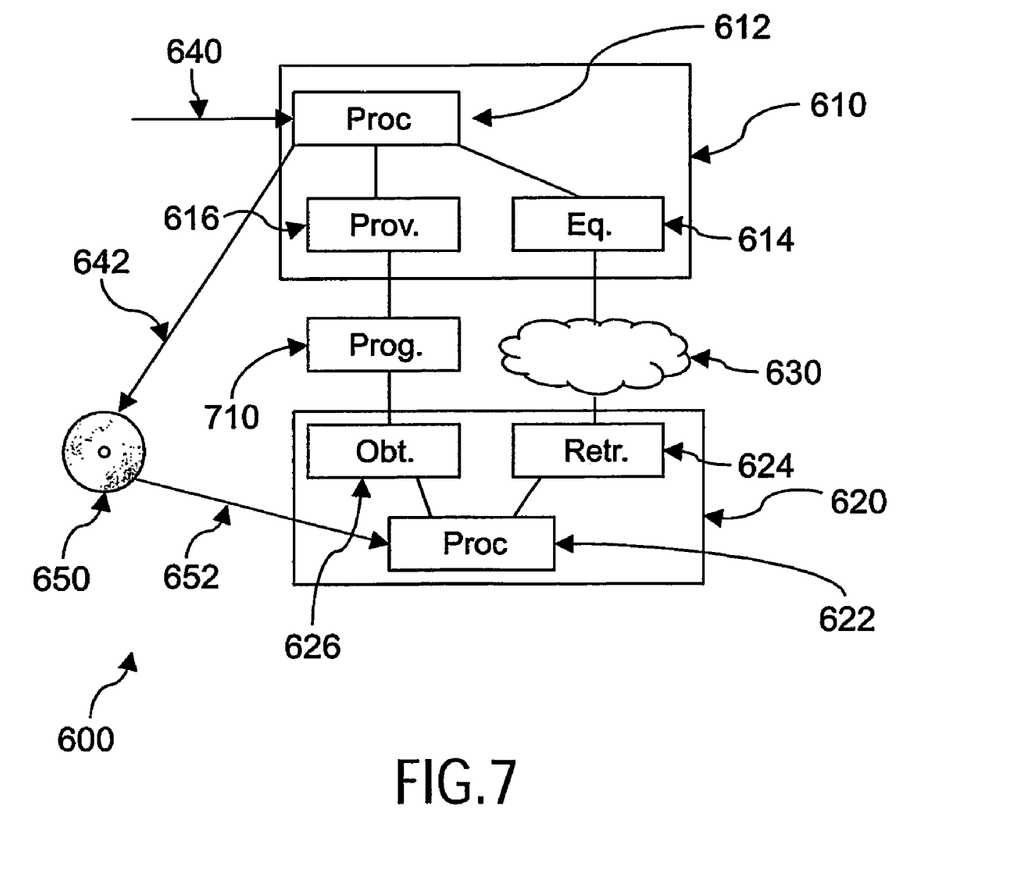
FIG. 7 shows a further embodiment of a system according to the invention.

FIG. 7 shows a preferred embodiment wherein the execution device function cascade is provided to the executing device 620 embedded in a software program 710 for execution by the processor 622. Same numbers in FIG. 7 refers to the same items as used in FIG. 6. The software program 710 may be a plug-in for a program like a media player. Thus, the means 614 of FIG. 7 may supply this plug-in 710 via the Internet (e.g. item 630 of FIG. 7) or embed it directly into the executing device 620 during manufacturing.

In an embodiment, the functions $g_1, \ldots, g_N$ are supplied to the executing device 620 in the form of a plug-in for the program 710. In the case where the program 710 is already a plug-in, the functions $g_1, \ldots, g_N$ are effectively a plug-in for a plug-in. Alternatively, the functions $g_1, \ldots, g_N$ are provided to the executing device 620 by embedding the functions $g_1, \ldots, g_N$ in the software program 710 by applying the execution device function cascade to the function parameters $g_1, \ldots, g_N$. In this way, the program 710 embeds both the functions $h_i$ and $g_i$.

In an embodiment, each executing device and/or user of the executing device is unique and identified by a unique identity (e.g., a unique number j). In the system and method according to the invention, it is ensured that the sequences $g_i$ and $h_i$ are unique for the involved party. This can be achieved by obtaining the unique identity j of the executing device and/or user of the executing device a respective set of 2N invertible permutations $p_i$ that is unique for the obtained identity. Similarly, using the same set of permutations, a unique sequence of the permutations may be chosen. Both techniques (choosing a different set of permutations or a different sequence of permutations) may be combined. Preferably, the server stores (in a secure way) the unique set/sequence for each unique identity. In this way, each software media player in a personal computer can be supplied with a unique plug-in for decrypting and/or decoding a media title. The medium itself need not be unique. The encrypted content only depends on the encryption functions, not on the unique set/sequence of permutations. By regularly (e.g. at start-up of the media player) checking whether the software corresponds to the identity and only executing the software if a match can be established it can be ensured that no player software can be executed on a PC to which it does not belong. If inadvertently a hacker manages to obtain the device-specific permutations they can only be used on the involved PC, possible also for content protected with a different encryption (resulting in different functions $f_i$), but not on different platforms.

Above a method and system have been described wherein a signal processing function cascade is supplied to executing devices in an obfuscated way. For each device the same set/sequence of permutations may be used or a device-specific set/sequence may be used. In the remainder an preferred approach is described for achieving a device-specific set/sequence by distributing the signal function cascade ('key') in an obfuscated way that is the same for each device and using a conversion routine ('loader') that converts the common key to a device-specific key. The 'common key' is created in much the same way as described before. The common key can in principle 'unlock' a reference player or anonymous player that, however, in this embodiment is not executed by any actual executing device. As before, the method includes selecting a set of 2N invertible permutations $p_i$, where $1 \leq i \leq 2N$ and calculating a set of N functions $g_i$, where $g_i$ is functionally equivalent to $p_{2i}^{-1} \circ f_i \circ p_{2i-1}$, for $1 \leq i \leq N$. Now additionally, the method includes selecting for each executing device, each identified by a unique index j, a corresponding set and/or sequence of 2N invertible permutations $p_{j,i}$, that is unique for the device and/or a user of the device. This set is used to provide each device a unique 'player'. This unique player is formed by calculating for each executing device j a corresponding set of N−1 functions $h_{j,i}$, where $h_{j,i}$ is function-ally equivalent to $p_{j,2i-1}^{-1} \circ p_{j,2i-2}$ for $2 \leq i \leq N$ and equipping each executing device j with a respective execution device function cascade $ED_j(y_1, \ldots, y_N)$ that includes $y_N \circ h_{j,N} \circ y_{N-1} \circ h_{j,N-1} \circ \ldots \circ y_1$. This device-specific set $h_{j,i}$, however, does not match the obfuscated function cascade, that can 'unlock' a reference player that uses set $h_i$. This latter set/player set is not made available to any executing device. Instead, the executing device j is equipped with a respective loader function $loader_j(x_1, \ldots, x_N) = (l_{j,1} \circ x_1 \circ r_{j,1}, \ldots, l_{j,N} \circ x_N \circ r_{j,N})$, where $l_{j,i}$ is functionally equivalent to $p_{j,2i}^{-1} \circ p_{2i}$ and $r_{j,i}$ is functionally equivalent to $p_{2i-1}^{-1} \circ p_{j,2i-1}$. As before, each executing device is provided with the same functions $g_1, \ldots, g_N$. The executing device then executes $ED_j(loader_j(g_1, \ldots, g_N))$. In this formula $loader_j(g_1, \ldots, g_N)$ effectively converts the anonymous key $g_1, \ldots, g_N$ into a device-specific key that optimally matches the execution device function cascade $ED_j(y_1, \ldots, y_N)$. Using the definition that $loader_j(g_1, \ldots, g_N) = (g_{j,1}, g_{j,2}, \ldots, g_{j,N})$, the i-th component of $loader_j(g_1, \ldots, g_N)$ is $g_{j,i} = l_{j,i} \circ g_i \circ r_{j,i}$. Using the definitions given above, this gives $g_{j,i} = p_{j,2i}^{-1} \circ p_{2i} \circ p_{2i}^{-1} \circ f_i \circ p_{2i-1} \circ p_{2i-1}^{-1} \circ p_{j,2i-1}$, that can be rewritten as $g_{j,i} = p_{j,2i}^{-1} \circ f_i \circ p_{j,2i-1}$. This is the same as using a device-specific set/sequence of permutations, where the device-specific set $h_{j,i}$ eliminates the permutations.

Figure 8:
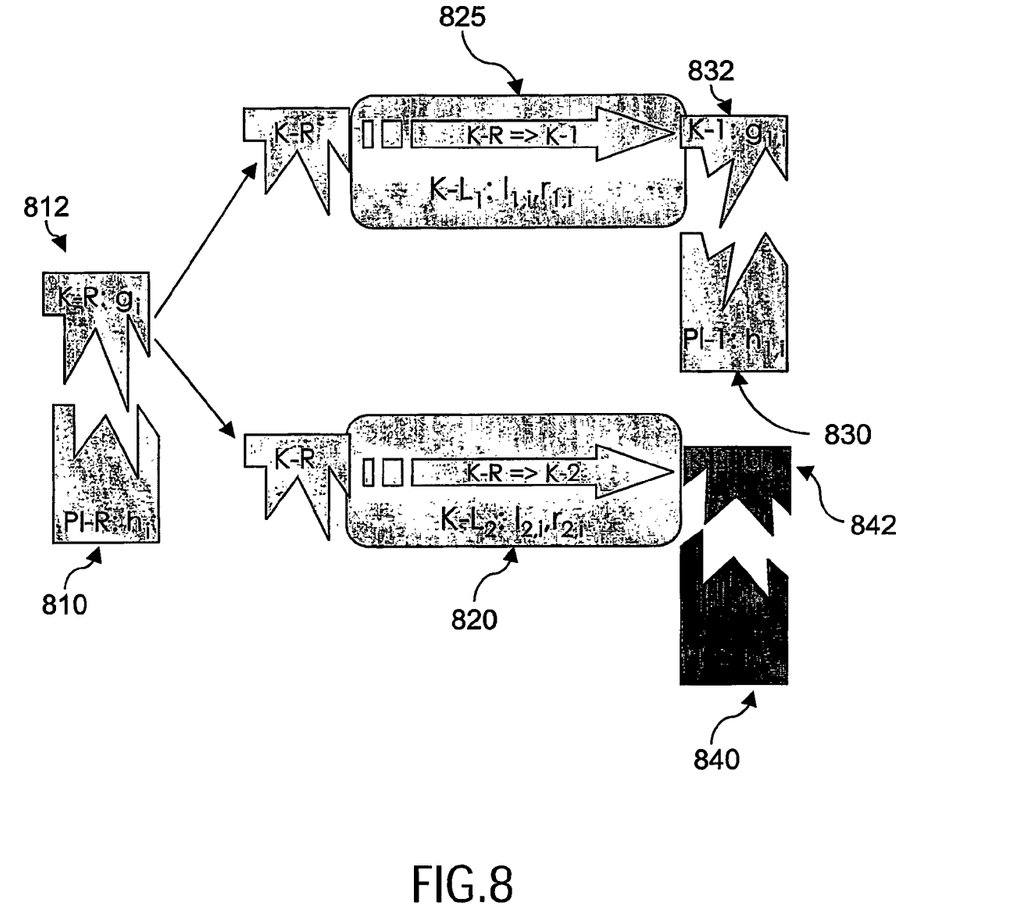
FIG. 8 illustrates anonymous obfuscation according to the invention.
Figure 9:
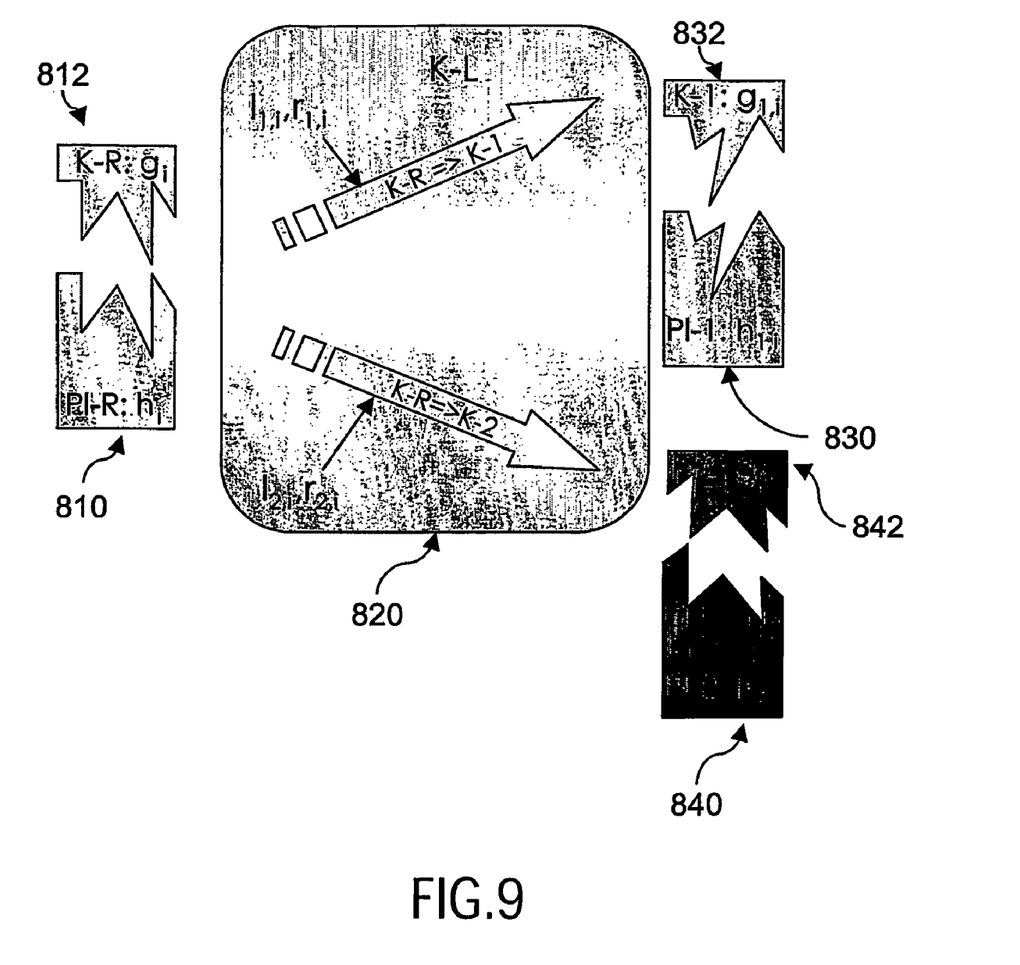
FIG. 9 illustrates an alternative embodiment for anonymous obfuscation.

The concept of using an anonymous obfuscated key and a device-specific loader is also illustrated in FIG. 8. The anonymous player Pl-R 810 incorporates the functions $h_i$. The anonymous player Pl-R can be unlocked by the corresponding key K-R 812 that includes the obfuscated signal processing functions $f_i$ in the form of the set $g_i$. The anonymous player Pl-R is not disclosed to any party. Each party is instead provided with a unique, device-specific player, shown are players Pl-1 830 and Pl-2 840. The common key K-R is provided to all parties. However, this common key does not match the specific players. Therefore, each party is also provided with a device-specific key loader K-L, shown are 820 and 825. The loader 820, 825 is used to convert the anonymous key K-R 812 into a device-specific key K-j. To this end, loader K-L$_j$ includes the functions $l_{j,i}$ and $r_{j,i}$. As is shown in FIG. 8, in principle, a device-specific loader is used. As is further illustrated in FIG. 9, in fact, the loader may be the same, but fed with the device-specific functions $l_{j,i}$ and $r_{j,i}$. In the example of FIG. 9, being fed with $l_{1,i}$ and $r_{1,i}$ converts the anonymous key K-R 812 into the device specific key 832 for device 1; being fed with $l_{2,i}$ and $r_{2,i}$ converts the anonymous key 812 into the key 842 for device 2. The device-specific players 830, 840 are then unlocked using the device-specific key sets $h_{1,i}$, 832 and 842, respectively. It will be appreciated that in these examples, the phrase 'key' and 'player' is interchangeable since two chains of functions inter-lock. The example of FIG. 4 illustrates both chains as keys. In an analogous way, it could also be illustrated as two interlocking players.

It will now be understood that the anonymous player 810 (incorporating $g_N, \ldots, g_1$) may advantageously be provided to each executing device through broadcasting and/or distribution on a storage medium with a same content for each executing device, simply because this player is the same for each device. Similarly, the digital signal input x to be processed by each executing device can be distributed through broadcasting and/or distribution on a storage medium with a same content for each executing device. The loader-specific aspects are preferably provided to executing device j through a 'one-to-one communication channel' and/or a storage medium with a device-specific content with at least one the following sets of corresponding functions: $h_{j,i}$, $l_{j,i}$, or $r_{j,i}$. The 'one-to-one communication channel' may be achieved in any suitable way. Preferably, the server downloads the device-specific information via a secure link (e.g. SSL) using Internet.

As described above, the function $f$ may be a decryption function based on a Feistel cipher network and each of the signal processing functions $f_i$ is a respective Feistel decryption round function. In such a case, each of the permutations $p_i$ is preferably a Feistel transformer where a function Q operating on a sequential pair $<x,y>$ is a Feistel transformer if there exist invertible functions $Q_x$ and $Q_y$ and $Q(\langle x,y \rangle) = \langle Q_x(x), Q_y(y) \rangle$, where $Q_x(x) \oplus Q_x(y) = Q_x(x \oplus y)$ and $Q_y(x) \oplus Q_y(y) = Q_y(x \oplus y)$. If these conditions are met, the functions $f_i$ can be optimally hidden. In practice, it can be shown that many such Feistel transformers exist, giving ample room for device-specific choices of permutations. The definition of the Feistel transformer is based on the insight that using the definitions given above a Feistel round $f_i(\langle L_{i-1}, R_{i-1} \rangle) = \langle R_{i-1}, (L_{i-1} \oplus F(R_{i-1}, K_i)) \rangle$ can be seen as $f_i = \text{swap} \circ \text{involutary}_F$, with the definitions $\text{swap}(\langle x,y \rangle) = \text{swap}(\langle y,x \rangle)$ and $\text{involutary}_F(\langle x,y \rangle) = \langle x, y \oplus F(x) \rangle$. It then holds that $\text{swap}^{-1} = \text{swap}$ and $\text{involutary}_F^{-1} = \text{involutary}_F$.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal that may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of providing a digital signal processing function $f$ to an executing device having at least one processor in an obfuscated form; the function $f$ including a function cascade including a plurality of signal processing functions $f_i$, $1 \leq i \leq N$, for processing a digital signal input x to yield a digital signal output, the method including:
    performing the following steps by at least one processor of the executing device:
        selecting a set of 2N invertible permutations $p_i$, $1 \leq i \leq 2N$;
        calculating a set of N functions $g_i$, where $g_i$ is functionally equivalent to $p_{2i}^{-1} \circ f_i \circ p_{2i-1}$, for $1 \leq i \leq N$;
        calculating a set of N−1 functions $h_i$, where $h_i$ is functionally equivalent to $p_{2i-1}^{-1} \circ p_{2i-2}$, for $2 \leq i \leq N$;
        equipping the executing device with an execution device function cascade that includes $y_N \circ h_N \circ y_{N-1} \circ h_{N-1} \circ \ldots \circ y_1$, where $y_1, \ldots, y_N$ are function parameters,
        providing the functions $g_1, \ldots, g_N$ to the executing device; and
    in the executing device, applying the execution device function cascade to the functions $g_1, \ldots, g_N$, wherein the execution of the $g_i$ and $h_i$ functions by the executing device in an interleaved manner enables the functionality of the execution device function cascade to be achieved without function $f$ being directly recognizable.

2. A method of providing a digital signal processing function $f$ as claimed in claim 1, wherein the execution device function cascade includes $y_N \circ h_N \circ y_{N-1} \circ h_{N-1} \circ \ldots \circ y_1 \circ p_1^{-1}$.

3. A method of providing a digital signal processing function $f$ as claimed in claim 1, wherein the function cascade starts with a further signal processing function $f_0$ and the execution device function cascade includes $y_N \circ h_N \circ y_{N-1} \circ h_{N-1} \circ \ldots \circ y_1 \circ S_1$, where $S_1$ is functionally equivalent to $p_1^{-1} \circ f_0$.

4. A method of providing a digital signal processing function $f$ as claimed in claim 1, wherein the execution device function cascade includes $p_{2N} \circ y_N \circ h_N \circ y_{N-1} \circ h_{N-1} \circ \ldots \circ y_1$.

5. A method of providing a digital signal processing function $f$ as claimed in claim 1, wherein the function cascade ends with a further signal processing function $f_{N+1}$, and the execution device function cascade includes $S_2 \circ y_N \circ h_N \circ y_{N-1} \circ h_{N-1} \circ \ldots \circ y_1$ where $S_2$ is functionally equivalent to $f_{N+1} \circ p_{2N}$.

6. A method of providing a digital signal processing function $f$ as claimed in claim 1, including obtaining a unique identity of the executing device and/or user of the executing device; the set and/or sequence of 2N invertible permutations $p_i$ being unique for the obtained identity.

7. A method as claimed in claim 1, wherein the step of equipping the executing device with the execution device function cascade includes providing the execution device function cascade embedded in a software program for execution by a processor in the executing device.

8. A method as claimed in claim 7, wherein the step of providing the functions $g_1, \ldots g_N$ to the executing device includes providing the functions $g_1, \ldots, g_N$ in the form of a plug-in for the program.

9. A method as claimed in claim 7, wherein the step of providing the functions $g_1, \ldots g_N$ to the executing device includes embedding the functions $g_1, \ldots g_N$ in the software program by applying the execution device function cascade to the function parameters $g_1, \ldots g_N$.

10. A computer program product stored on a non-transitory computer readable storage medium that is operative to cause a processor in an execution device to execute a digital signal processing function $f$ including a function cascade including a plurality of signal processing functions $f_i$, where $1 \leq i \leq N$, for processing a digital signal input x to yield a digital signal output, by:

performing the following steps by at least one processor of the execution device:
loading an execution device function cascade that includes $y_N \circ h_N \circ y_{N-1} \circ h_{N-1} \circ \ldots \circ y_1$, where $y_1, \ldots, y_N$ are function parameters,
loading a set of functions $g_1, \ldots, g_N$;
applying the execution device function cascade to the set of functions $g_1, \ldots, g_N$;
where:
$g_i$ is functionally equivalent to $p_{2i}^{-1} \circ f_i \circ p_{2i-1}$, for $1 \leq i \leq N$;
$h_i$ is functionally equivalent to $p_{2i-1}^{-1} \circ p_{2i-2}$, for $2 \leq i \leq N$; and
$p_i$ is an invertible permutation, for $1 \leq i \leq 2N$.

11. A system for providing a digital signal processing function $f$ to an executing device in an obfuscated form; the system including a server (610) and an executing device (620); the function $f$ including a function cascade including a plurality of signal processing functions $f_i$, $1 \leq i \leq N$, for processing a digital signal input x to yield a digital signal output;
the server including a processor (612) for performing the following steps, under control of a program:
selecting a set of 2N invertible permutations $p_i$, $1 \leq i \leq 2N$;
calculating a set of N functions $g_i$, where $g_i$ is functionally equivalent to $p_{2i}^{-1} \circ f_i \circ p_{2i-1}$, for $1 \leq i \leq N$; and
calculating a set of N−1 functions $h_i$, where $h_i$ is functionally equivalent to $p_{2i-1}^{-1} \circ p_{2i-2}$, for $2 \leq i \leq N$; and
means (614) for equipping the executing device with an execution device function cascade that includes $y_N \circ h_N \circ y_{N-1} \circ h_{N-1} \circ \ldots \circ y_1$, where $y_1, \ldots, y_N$ are function parameters, and
means (616) for providing the functions $g_1, \ldots, g_N$ to the executing device; and
the executing device (620) including:
means (626) for obtaining the functions $g_1, \ldots, g_N$ from the server; and
a processor (622) for, under control of a program, loading the execution device function cascade and applying the loaded execution device function cascade to the functions $g_1, \ldots, g_N$, wherein the execution of the $g_i$ and $h_i$ functions by the executing device in an interleaved manner enables the functionality of the execution device function cascade to be achieved without function $f$ being directly recognizable.

12. An execution device (620) for use in the system as claimed in claim 11; the executing device including:
means (626) for obtaining the functions $g_1, \ldots, g_N$ from the server; and
a processor (622) for, under control of a program, applying the execution device function cascade to the functions $g_1, \ldots, g_N$ and applying the applied device function cascade to the digital signal input x.

13. A method of providing a digital signal processing function $f$ to a plurality of executing devices, each identified by a unique index j, in an obfuscated, anonymous form; the function $f$ including a function cascade including a plurality of signal processing functions $f_i$, where $1 \leq i \leq N$, for processing a digital signal input x to yield a digital signal output the method including:
performing the following steps by at least one processor:
selecting a set of 2N invertible permutations $p_i$, where $1 \leq i \leq 2N$;
calculating a set of N functions $g_i$, where $g_i$ is functionally equivalent to $p_{2i}^{-1} \circ f_i \circ p_{2i-1}$, $1 \leq i \leq N$;

selecting for each device j a corresponding set and/or sequence of 2N invertible permutations $p_{j,i}$, that is unique for the device and/or a user of the device;
calculating for each executing device j a corresponding set of N−1 functions $h_{j,i}$, where $h_{j,i}$ is functionally equivalent to $p_{j,2i-1}^{-1} \circ p_{j,2i-2}$ for $2 \leq i \leq N$;
equipping each executing device j with a respective execution device function cascade $ED_j(y_1, \ldots, y_N)$ that includes $y_N \circ h_{j,N} \circ y_{N-1} \circ h_{j,N-1} \circ \ldots \circ y_1$;
equipping each executing device j with a respective loader function $loader_j(x_1, \ldots, x_N) = (l_{j,1} \circ x_1 \circ r_{j,1}, \ldots, l_{j,N} \circ x_N \circ r_{j,N})$, where $l_{j,i}$ is functionally equivalent to $p_{j,2i}^{-1} \circ p_{2i}$ and $r_{j,i}$ is functionally equivalent to $p_{2i-1}^{-1} \circ p_{j,2i}^{-1}$;
providing to the executing device the functions $g_1, \ldots, g_N$; and
in the executing device, executing $ED_j(loader_j(g_1, \ldots, g_N))$.

14. A method of providing a digital signal processing function $f$ as claimed in claim 13, including providing $g_1, \ldots, g_N$ to each executing device through broadcasting and/or distribution on a storage medium with a same content for each executing device.

15. A method of providing a digital signal processing function $f$ as claimed in claim 14, including also providing the digital signal input x to each executing device through broadcasting and/or distribution on a storage medium with a same content for each executing device.

16. A method of providing a digital signal processing function $f$ as claimed in claim 13, including providing to executing device j through a one-to-one communication channel and/or a storage medium with a device-specific content at least one the following sets of corresponding functions: $h_{j,i}$, $l_{j,i}$ or $r_{j,i}$.

17. A method of providing a digital signal processing function $f$ as claimed in claim 1, wherein the function $f$ is a decryption function based on a Feistel cipher network and each of the signal processing functions $f_i$ is a respective Feistel decryption round function.

18. A method of providing a digital signal processing function $f$ as claimed in claim 17, wherein each of the permutations $p_i$ is a Feistel transformer where a function Q operating on a sequential pair <x, y> is a Feistel transformer if there exist invertible functions $Q_x$ and $Q_y$ and $Q(\langle x, y \rangle) = \langle Q_x(x), Q_y(y) \rangle$, where $Q_x(x) \oplus Q_x(y) = Q_x(x \oplus y)$ and $Q_y(x) \oplus Q_y(y) = Q_y(x \oplus y)$.

19. A computer program product stored on a non-transitory computer readable storage medium that is operative to cause a processor in an execution device j to execute a digital signal processing function $f$ including a function cascade including a plurality of signal processing functions $f_i$, where $1 \leq i \leq N$, for processing a digital signal input x to yield a digital signal output, the method including:
performing the following steps by at least one processor of the execution device:
loading an execution device function cascade that is unique for the execution device and that includes $y_N \circ h_{j,N} \circ y_{N-1} \circ h_{j,N-1} \circ \ldots \circ y_1$, where $y_1, \ldots, y_N$ are function parameters,
loading a loader function $loader_j(x_1, \ldots, x_N) \equiv (l_{j,1} \circ x_1 \circ r_{j,1}, \ldots, l_{j,N} \circ x_N \circ r_{j,N})$,
loading a set of functions $g_1, \ldots, g_N$;
applying the loader function to the set of functions $g_1, \ldots, g_N$ yielding a set of functions $g_{j,1}, \ldots, g_{j,N}$ and applying the execution device function cascade to the set of functions $g_{j,1}, \ldots, g_{j,N}$, where:

$g_i$ is functionally equivalent to $p_{2i}^{-1} \circ f_i \circ p_{2i-1}$, for $1 \leq i \leq N$;

$p_i$ is an invertible permutation, for $1 \leq i \leq N$;

$h_{j,i}$ is functionally equivalent to $p_{j,2i-1}^{-1} \circ p_{j,2i-2}$ for $2 \leq i \leq N$;

$l_{j,i}$ is functionally equivalent to $p_{j,2i}^{-1} \circ p_{2i}$;

$r_{j,i}$ is functionally equivalent to $p_{2i-1}^{-1} \circ p_{j,2i-1}$; and $p_{j,i}$ are invertible permutations, for $1 \leq i \leq 2N$, being unique for the device and/or a user of the device.

20. A system for providing a digital signal processing function $f$ to a plurality of executing devices, in an obfuscated, anonymous form; the system including a server and a plurality of executing devices, each identified by a unique index j; the function $f$ including a function cascade including a plurality of signal processing functions $f_i$, where $1 \leq i \leq N$, for processing a digital signal input x to yield a digital signal output;

the server including a processor for performing the following steps, under control of a program:

selecting a set of 2N invertible permutations $p_i$, where $1 \leq i \leq 2N$;

calculating a set of N functions $g_i$, where $g_i$ is functionally equivalent to $p_{2i}^{-1} \circ f_i \circ p_{2i-1}$, for $1 \leq i \leq N$;

selecting for each device j a corresponding set and/or sequence of 2N invertible permutations $p_{j,i}$, that is unique for the device and/or a user of the device;

calculating for each executing device j a corresponding set of N−1 functions $h_{j,i}$, where $h_{j,i}$ is functionally equivalent to $p_{j,2i-1}^{-1} \circ p_{j,2i-2}$ for $2 \leq i \leq N$;

equipping each executing device j with a respective execution device function cascade $ED_j(y_1, \ldots, y_N)$ that includes $y_N \circ h_{j,N} \circ y_{N-1} \circ j, h_{N-1} \circ \ldots \circ y_1$;

equipping each executing device j with a respective loader function $loader_j(x_1, \ldots, x_N) = (l_{j,1} \circ x_1 \circ r_{j,1}, \ldots, l_{j,N} \circ x_N \circ r_{j,N})$, where $l_{j,i}$ is functionally equivalent to $p_{j,2i}^{-1} \circ p_{2i}$ and $r_{j,i}$ is functionally equivalent to $p_{2i-1}^{-1} \circ p_{j,2i-1}$; and providing to the executing device the functions $g_1, \ldots, g_N$; and each executing device j, means for obtaining the functions $g_1, \ldots, g_N$ from the server; and a processor for, under control of a program:

loading an execution device function cascade that is unique for the execution device and that includes $y_N \circ j, h_N \circ y_{N-1} \circ h_{j,N-1} \circ \ldots \circ y_1$, where $y_1, \ldots, y_N$ are function parameters, loading a loader function $loader_j(x_1, \ldots, x_N) \equiv (l_{j,1} \circ x_1 \circ r_{j,1}, \ldots, l_{j,N} \circ x_N \circ r_{j,N})$ applying the loader function to the set of functions $g_1, \ldots, g_N$ yielding a set of functions $g_{j,1}, \ldots, g_{j,N}$; and applying the execution device function cascade to the set of functions $g_{j,1}, \ldots, g_{j,N}$.

21. An execution device for use in the system as claimed in claim 20; where the executing device is identified by a unique index j; and includes:

means for obtaining the functions $g_1, \ldots, g_N$ from the server; and a processor for, under control of a program:

loading an execution device function cascade that is unique for the execution device and that includes $y_N \circ h_{j,N} \circ y_{N-1} \circ h_{j,N-1} \circ \ldots \circ y_1$, where $y_1, \ldots, y_N$ are function parameters, loading a loader function $loader_j(x_1, \ldots, x_N) \equiv (l_{j,1} \circ x_1 \circ r_{j,1}, \ldots, l_{j,N} \circ x_N \circ r_{j,N})$ applying the loader function to the set of functions $g_1, \ldots, g_N$ yielding a set of functions $g_{j,1}, \ldots, g_{j,N}$; and applying the execution device function cascade to the set of functions $g_{j,1}, \ldots, g_{j,N}$ where:

$g_i$ is functionally equivalent to $p_{2i}^{-1} \circ f_i \circ p_{2i-1}$ for $1 \leq i \leq N$;

$p_i$ is an invertible permutation, for $1 \leq i \leq N$;

$h_{j,i}$ is functionally equivalent to $p_{j,2i-1}^{-1} \circ p_{j,2i-2}$ for $2 \leq i \leq N$;

$l_{j,i}$ is functionally equivalent to $p_{j,2i}^{-1} \circ p_{2i}$;

$r_{j,i}$ is functionally equivalent to $p_{2i-1}^{-1} \circ p_{j,2i-1}$; and $p_{j,i}$ are invertible permutations, for $1 \leq i \leq 2N$, being unique for the device and/or a user of the device.

* * * * *